United States Patent [19]
Widlansky et al.

[11] 3,844,110
[45] Oct. 29, 1974

[54] GAS TURBINE ENGINE INTERNAL LUBRICANT SUMP VENTING AND PRESSURIZATION SYSTEM

[75] Inventors: William Widlansky; Bernard L. Koff, both of Cincinnati, Ohio

[73] Assignee: General Electric Company, Cincinnati, Ohio

[22] Filed: Feb. 26, 1973

[21] Appl. No.: 335,706

[52] U.S. Cl. ............... 60/39.08, 60/39.66, 184/6.11, 417/369, 417/372
[51] Int. Cl. ............................................. F02c 7/06
[58] Field of Search .................. 60/39.08; 184/6.11; 417/408, 369, 372

[56] References Cited
UNITED STATES PATENTS

| | | | |
|---|---|---|---|
| 2,680,001 | 6/1954 | Batt | 184/6.11 |
| 2,791,091 | 5/1957 | Wheatley et al. | 417/408 |
| 2,951,337 | 9/1960 | Atkinson et al. | 70/39.08 |
| 3,285,566 | 11/1966 | Schmitz et al. | 184/6.11 |
| 3,382,670 | 5/1968 | Venable | 417/408 |
| 3,433,020 | 3/1969 | Earle et al. | 60/39.08 |
| 3,527,054 | 9/1970 | Hemsworth | 60/39.08 |
| 3,528,241 | 9/1970 | Venable et al. | 60/39.08 |
| 3,647,313 | 3/1972 | Koff | 184/6.11 |

*Primary Examiner*—C. J. Husar
*Assistant Examiner*—Warren Olsen
*Attorney, Agent, or Firm*—Derek P. Lawrence; Lee H. Sachs

[57] ABSTRACT

An improved bearing sump pressurization, venting and scavenge system for a gas turbine engine includes a plurality of separate flow paths formed internally of the engine by existing rotor and stator assembly components. At least one of a number of axially separated sump chambers is both pressurized and scavenged completely internally of the engine by means of these flow paths, thus minimizing the need for external piping and/or piping extending across the gas flow path of the engine.

10 Claims, 4 Drawing Figures

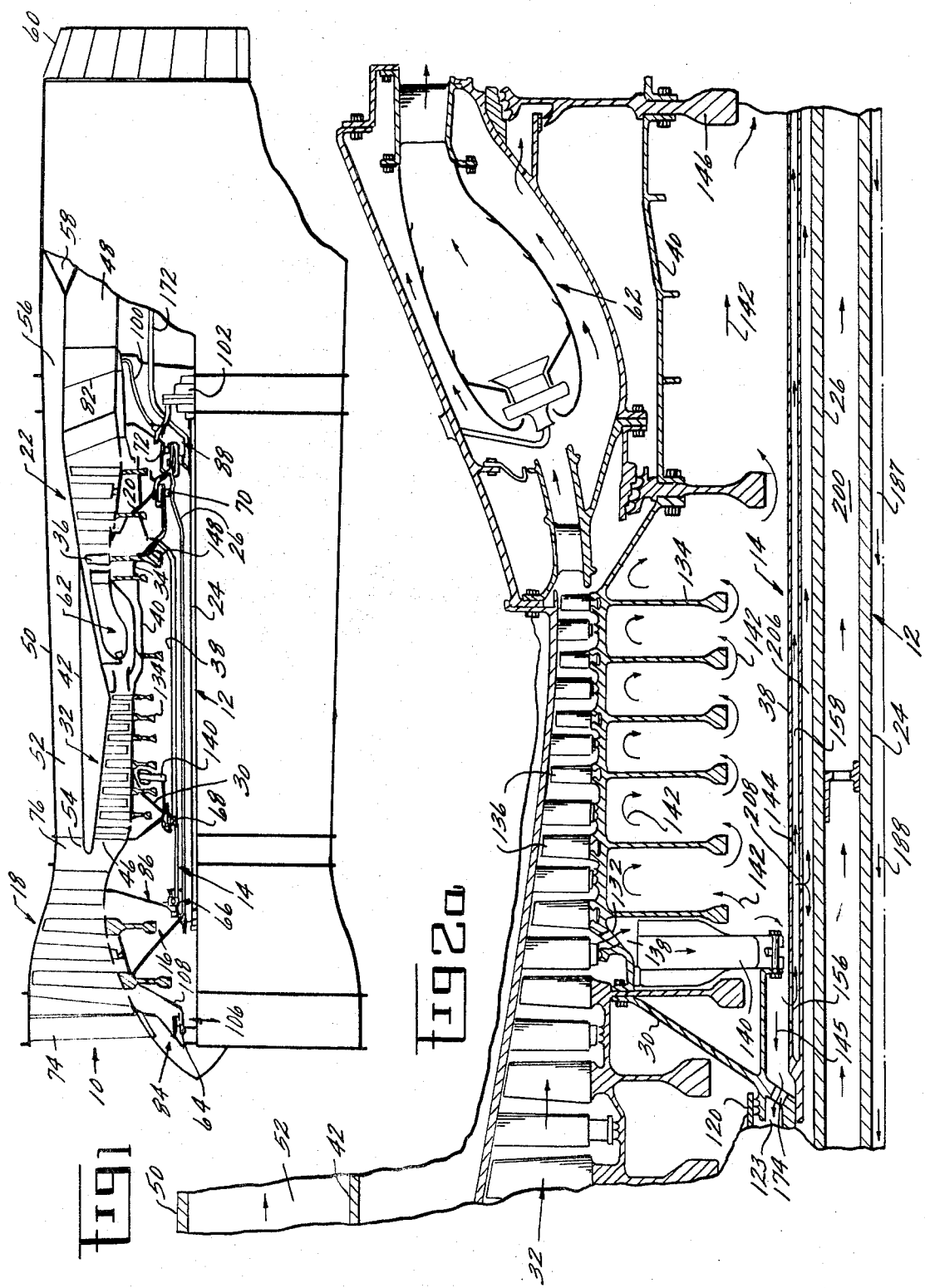

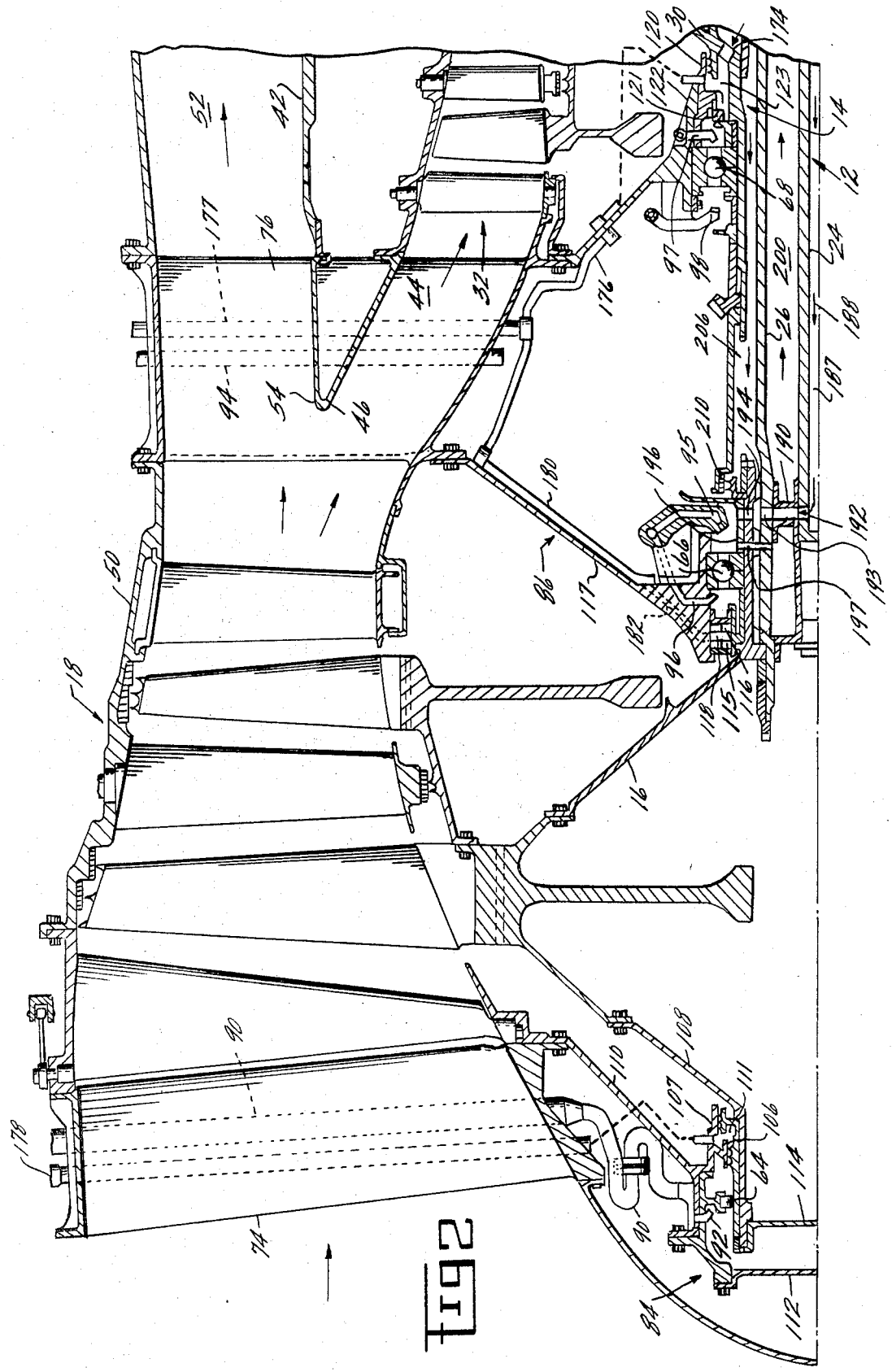

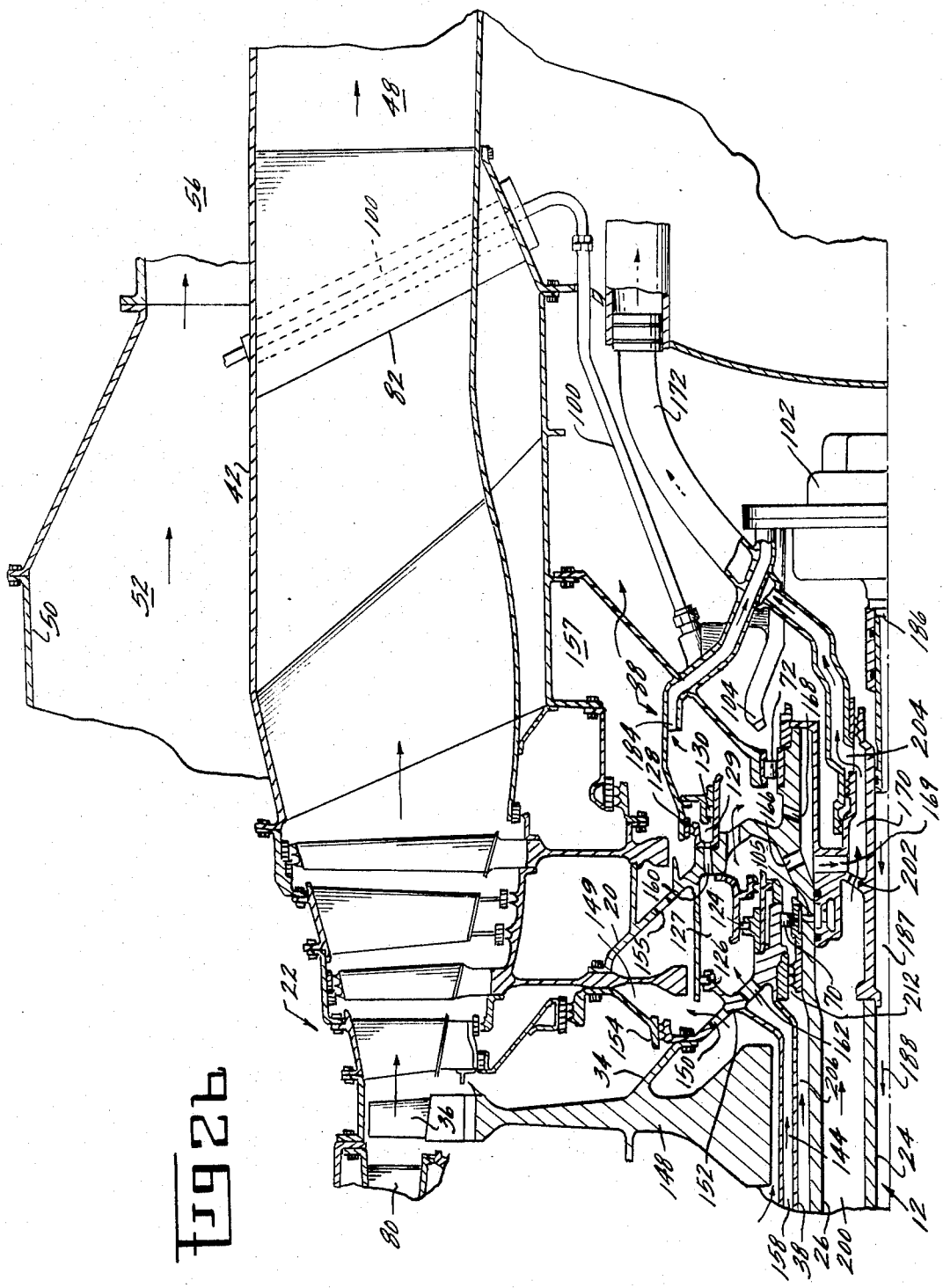

GAS TURBINE ENGINE INTERNAL LUBRICANT SUMP VENTING AND PRESSURIZATION SYSTEM

BACKGROUND OF THE INVENTION

This invention relates generally to gas turbine engines and more particularly, to an improved lubricant scavenge, sump venting and pressurization system for such engines.

The invention herein described was made in the course of or under a contract, or a subcontract thereunder, with the United States Department of the Air Force.

Gas turbine engines generally comprise one or more hollow shafts journaled within a casing structure by means of a series of bearing assemblies. The bearing assemblies are generally positioned at spaced locations along the shaft or shafts and enclosed by one or more bearing or sump chambers through which a lubricating fluid is circulated. The sump chambers generally include one or more annular seals at the junction of the shaft or shafts and casing structure portion defining the chamber and, in some instances, between shafts. In order to prevent loss of lubricating fluid through such seals and to maintain the lubricating fluid at an acceptable temperature, a pressurization system is generally provided to direct relatively cool air into each bearing chamber through its respective seals and prevent oil from leaving the chamber through the seals. In order to maintain a pressure drop across the seals so as to ensure a continuous flow of cool air into each sump chamber and prevent loss of oil, the air flowing into the sump chamber must be at a higher pressure level than the air within the chamber. For this reason, the air within the chamber must be continuously removed or vented therefrom.

One of the major problems in such lubricant sump air circulation and pressurization systems is the removal or venting of the air from the sump without carrying overboard excess quantities of lubricating fluid. A similar major problem exists in attempting to supply pressurized fluid to each of the sump chambers with a minimum amount of piping mounted externally of the engine and a minimum amount of piping which must pass through the gas flow path of the engine.

In the past it has been common practice to both vent and pressurize the sump chambers through conduits which extend through the struts of the supporting casing structure of the engine. These struts have necessarily extended through the gas flow path and must be of sufficient size to surround the conduits located therein. As is well known to those skilled in the art, any obstruction located within a gas flow path decreases the overall efficiency of the engine. It is therefore desirable to minimize not only the number but the overall size of the struts extending through the flow path area. In order to accomplish this desired end, it is necessary to minimize the amount of piping which must extend across the flow path.

Since a pressure drop must be maintained across the seals which are associated with each sump chamber in order to preclude lubricant from being lost across such seal, it has become common practice to use air which is bled from either the gas turbine engine fan or compressor as a pressurizing fluid to maintain the desired pressure drop across the seals. Since one or more of the sump chambers are located in the low pressure turbine area of most gas turbine engines, it becomes necessary to deliver this pressurized air from the compressor to a sump chamber located at the opposite end of the engine. In the past it has been common practice to provide this pressurized air through piping mounted externally of the engine casing. When one considers, however, that almost all of the gas turbine engine controls and accessories must be mounted on the external engine casing, and when one considers further that it is desirable to maintain the overall envelope or cross section of the engine at a minimum area, it becomes clear that it is desirable to provide the pressurizing fluid to the low pressure turbine sump chambers in some manner other than through externally mounted piping, which is also subject to foreign object or handling damage.

As is further known to those skilled in the art, air bled from the compressor is also utilized for cooling purposes at many locations within the engine. If the pressurization and cooling air are extracted from the same point in the compressor, the mechanical complexity of the rotor could be greatly reduced. Therefore, it is highly desirable to provide a system in which air can be bled from a single location within the compressor and subsequently be utilized to pressurize most, if not all, of the sump chambers associated with the engine and can also be utilized for cooling purposes.

SUMMARY OF THE INVENTION

Accordingly, a primary object of this invention is to provide a highly effective and simplified system for both venting, scavenging and pressurizing gas turbine engine bearing or sump chambers which overcomes the foregoing problems and accomplishes the pressurizing, scavenging, venting and cooling functions with a minimum amount of external piping and a minimum amount of piping which must extend through the gas flow path of the engine.

Briefly stated, the above and similarly related objects are attained in the present instance by providing a sump venting and pressurization system in which air is bled radially inwardly from an intermediate stage of a compressor and is directed along separate flow paths, a first of which forms a coolant flow path for the compressor, and a second of which forms a pressurizing air flow path for a downstream sump chamber associated with the engine. A third flow path acts as a seal pressurization flow path for upstream and intermediate bearing chambers. A major portion of the pressurizing flow path is formed internally of the engine by utilizing internal engine structural components. In addition, the venting and scavenge flow paths are also formed by similar internal components.

DESCRIPTION OF THE DRAWINGS

While the specification concludes with a series of claims which particularly point out and distinctly claim the subject matter which Applicants consider to be their invention, a clear understanding of the invention will be had from the following description, which is given in connection with the accompanying drawings, in which:

FIG. 1 is a side elevational view, in half cross section, diagrammatically showing a gas turbine engine embodying the present invention;

FIG. 2 is an enlarged, cross-sectional view showing an upstream portion of the gas turbine enging of FIG. 1;

FIG. 2a is an enlarged, cross-sectional view showing an intermediate portion of the gas turbine engine of FIG. 1; and FIG. 2b is an enlarged, cross-sectional view showing a downstream portion of the gas turbine engine of FIG. 1.

DESCRIPTION OF A PREFERRED EMBODIMENT

Referring now to the drawings wherein like numerals correspond to like elements throughout, a gas turbine engine 10 has been shown in FIG. 1 to include hollow inner and outer concentric shaft assemblies 12 and 14, respectively. The inner shaft assembly 12 includes a fan rotor 16 for a first compressor or fan 18, a turbine rotor 20 for a second or low pressure turbine 22, and an intermediate shaft 26, which surrounds and is interconnected to a duct 24 and connected to the rotors 16 and 20 in a suitable manner. The outer shaft assembly 14 includes a rotor spool 30 for a second or high pressure compressor 32, a turbine rotor spool 34 for a first or high pressure turbine 36, an intermediate, generally cylindrical duct portion 38, which immediately surrounds the cylindrical shaft 26 of the shaft assembly 12, and a second intermediate, generally cylindrical portion 40, which surrounds and is radially spaced from the intermediate duct portion 38.

Referring still to FIG. 1, hollow, core engine casing means 42 are provided which enclose the high pressure compressor 32 and the low pressure and high pressure turbines 22 and 36. The casing means 42 define, in cooperation with the shaft assemblies 12 and 14 and their corresponding stationary structure, an annular motive fluid flow passageway 44 (FIG. 2) having an inlet 46 located between the fan 18 and the compressor 32 and an exhaust outlet 48 downstream of the low pressure turbine 22. As further shown in FIG. 1, a second casing means or fan cowling 50 is provided which encloses the fan 18 and defines, in conjunction with the casing means 42, an annular fan duct 52 having an inlet 54 and an outlet 56. If desired, a mixer 58 may be located downstream of the low pressure turbine to mix the air flowing through the core engine exhaust 48 with that flowing through the fan duct exhaust 56 prior to their exiting the engine 10 through an exhaust nozzle 60.

The operation of the turbofan engine 10 will be clearly understood by those skilled in the art and will thus be described only briefly herein in order to place the present invention in proper perspective. In operation, air is pressurized by the fan 18 and then flows either through the fan duct 52 to the fan duct outlet 56 where it flows through the mixer 58 or directly to the atmosphere through the exhaust nozzle 60 to provide a propulsive force. A second portion of the air pressurized by the fan 18 flows through the core engine inlet 46 for, in part, further pressurization by the high pressure compressor 32. The pressurized air from the compressor 32 and a suitable fuel are delivered to a combustor 62 wherein the fuel is burned to produce a hot gas stream for driving the high pressure turbine 36, the low pressure turbine 22 and shaft assemblies 12 and 14 which, in turn, drive the compressor 32 and the fan 18. Further propulsive thrust is provided by exhausting the annular hot gas stream flowing through the low pressure turbine 22 through the outlet 48 and thereafter mixing the same with the fan duct flow in the mixer 58 prior to its flowing through the exhaust nozzle 60.

The sump pressurization and venting system for the engine 10 forms a major portion of the present invention and will now be described in detail in connection with FIGS. 2, 2a and 2b.

The inner and outer shaft assemblies 12 and 14 are journaled for rotation by a plurality of bearing assemblies disposed at spaced locations along the shafts. For example, as shown in FIG. 2, a bearing assembly 64 is located at the front end of the fan rotor 16, while a second bearing assembly 66 is located at the aft end of the fan rotor 16. Another bearing assembly is located at the forward end of the compressor rotor 30 and is designated by the numeral 68 in FIG. 2, while further bearing assemblies 70 and 72 are located near the downstream ends of the shaft assemblies 12 and 14 as shown in FIG. 2b.

The bearing assemblies are structurally connected to the core engine casing means 42 and the fan casing means 50 through a plurality of hollow struts which extend radially across the gas flow passage. For example, in the gas turbine engine of FIG. 1, upstream struts 74 are provided upstream of the fan 18 and extend across the inlet of the engine. Intermediate struts 76 are provided immediately upstream of the core engine compressor 32 and extend across both the core engine inlet 46 and the fan duct 52. Downstream struts 82 are provided downstream of the low pressure turbine 22 as shown in FIGS. 1 and 2b.

As has been diagrammatically shown in FIG. 1 and shown in greater detail in FIGS. 2, 2a and 2b, the gas turbine engine 10 is adapted to form, in conjunction with at least one of the shaft assemblies 12 and 14, an annular upstream sump or bearing chamber 84, an annular intermediate sump or bearing chamber 86 and a downstream sump or bearing chamber 88 for enclosing the previously described bearing assemblies. As shown in FIG. 2, the upstream sump 84 encloses the bearing assembly 64, while the intermediate sump 86 encloses the bearing assemblies 66 and 68, respectively. Finally, as shown in FIG. 2b, the downstream sump 88 encloses the bearing assemblies 70 and 72.

As best shown in FIGS. 2, 2a and 2b, a circulating lubrication system is provided for the various bearing assemblies in order to supply the bearing assemblies with needed lubrication fluid during operation of the engine 10. As shown in FIG. 2, the upstream sump 84 is provided with a suitable lubricant from an appropriate sump tank (not shown) via tubing 90 which extends through one of the upstream struts 74. The lubricant is delivered to the sump 84 through one or more spray nozzles 92 located in the vicinity of the bearing assembly 64.

Similarly, the intermediate sump 86 is supplied with lubricant through tubing 94 which extends through one of the intermediate struts 76. The lubricant is then supplied to the bearing assemblies 66 and 68 via one or more spray nozzles 95, 96, 97 and 98.

Finally, lubricant is supplied to the downstream sump 88 via tubing 100 which extends through one of the downstream struts 82 shown in FIG. 2b. The lubricant is then metered and distributed to the bearing assemblies 70 and 72 through a metering and scavenge pump 102, which may take one of many forms, with a preferred version being shown in U.S. Pat. No. 3,618,710

— DeLisse et al, which patent is assigned to the same assignee as the present application. The lubricant which is delivered by the pump 102 is directed to the bearing assemblies 70 and 72 by means of orifices 104 and 105. The lubricating fluid so injected into the various bearing chambers is removed from the chambers and discharged to a suitable reservoir (not shown) in a manner to be presently described for repressurization and delivery to the bearing chambers.

To prevent loss of the lubricating fluid from the sump chambers 84, 86 and 88, suitable seals are provided at the junctions of the stationary engine structure and the rotating shaft or shafts defining each chamber. For example, and with reference to FIG. 2, seals 106 and 107 are provided at the intersection of rotating conical shaft member 108 and stationary conical member 110 to form a seal pressurization chamber 111. No sealing member is required on the opposite side of the bearing assembly 64 as the sump chamber is formed between two cylindrical plates 112 and 114, which are sealingly connected to the conical members 110 and 108, respectively. In like manner, and with reference still to FIG. 2, seals 115 and 116 are positioned between the fan rotor 16 and a stationary frame member 117 to form a seal pressurization chamber 118 for one side of the sump chamber 86, while seals 120 and 121 are formed between the compressor rotor 30 and conical stationary member 122 to form a seal pressurization chamber 123 at the opposite end of the sump chamber 86. Similarly, seals 124, 126, 128 and 130 provide seal pressurization chambers 127 and 129 for the sump chamber 88, as shown in FIG. 2b.

To further prevent lubricant leakage from the bearing chambers as well as to prevent excessive lubricant temperatures which might cause vaporization or coking of the lubricant, a system is provided to circulate relatively cool air pressurized by the compressor 32 through each bearing chamber. Generally, this system includes means for delivering pressurized compressor air into the seal pressurization chambers which surround each bearing chamber and then into the bearing chambers through their respective seals. The system further includes means for venting or discharging the air from the bearing chambers to a lower pressure region of the engine. For this reason, and as clearly shown in FIG. 2a, an opening 132 is formed at a suitable location within a compressor disc assembly, generally designated by the numeral 134, which comprises a plurality of rotating compressor discs adapted to provide mounting surfaces for a plurality of stages of compressor rotor blades 136. In this manner, air is bled from the compressor flow path through the opening or openings 132 into a bleed chamber 138 formed between two compressor rotor discs. A plurality of paddle wheels 140 are positioned within the bleed chamber 138 and are suitably connected to the compressor rotor disc for rotation therewith. The paddle wheels 140 act to preclude formation of a free-wheeling vortex in the compressor bleed air flowing through the chamber 138 as further described in U.S. Pat. No. 2,973,938 — Alford.

The compressor bleed air flows radially inwardly through the chamber 138 and then is split into three separate flow paths as shown by the line arrows generally designated by the numerals 142, 144 and 145, respectively, in FIG. 2a. The flow path designated by the numeral 142 constitutes a compressor coolant flow path, and the air flowing in this manner acts to cool the compressor rotor 30 and, in particular, the compressor disc assembly 134. The air also acts to cool the intermediate cylindrical portion 40 and discs 146 and 148 associated with the high pressure turbine 36 prior to exiting to a chamber 149 (FIG. 2b) through an opening 150 formed in a conical shaft member 152. This air then flows either across a seal 154 associated with the disc 148 prior to returning to the engine flow path downstream of the high pressure turbine 36 or through an opening 155 to a chamber 157 from which it re-enters the engine flow path.

Referring back to FIG. 2a, a second portion of the air flowing through the chamber 138 flows through one of a plurality of openings 156 formed in the intermediate cylindrical duct 38 and thereafter flows through an annular passageway 158 formed internally of the duct 38. As shown in FIG. 2b, this air then flows through openings 162 formed in the conical member 152 to pressurize the seal pressurization chamber 127 associated with the sump chamber 88. Air from the chamber 127 pressurizes the seals 124 and 126 and also flows across an orifice 160 to pressurize the seal pressurization chamber 129. The chambers 127 and 149 are separated from one another by the seal 126 such that the coolant air and the seal pressurization air are substantially precluded from mixing at this point.

Means for venting the bearing chamber 88, so as to promote the continual flow of cool, pressurized air across the seals into the chamber 88, are also shown in FIG. 2b. The venting means take the form of openings 166 and 168 formed in the cylindrical shaft 26 and an opening 169 formed in the downstream end of the shaft assembly 12. Air/oil mist will flow through the openings 166 and 168 during the normal course of operation of the engine 10. Due to rotation of the shaft assembly 12, oil particles will be centrifuged back into the bearing chamber 88 as the air/oil mist flows through the openings. The remaining "clean" air then flows to a chamber 170 formed at the downstream end of the shaft assembly 12. This air then flows through a vent pipe 172 from which it is vented overboard in a suitable manner.

Referring now to FIGS. 2 and 2a, the remaining portion of the air flowing through the bleed chamber 138, as designated by the numeral 145, flows forward through an opening 174 formed in the compressor rotor spool 30. The air flowing through the opening 174 pressurizes the seal pressurization chamber 123 associated with the intermediate sump 86. A portion of the air flowing into the chamber 123 is directed through tubing (not shown) which may lie either within or outside of the sump chamber 86, to tubing 176 and 177 which extends through one of the intermediate struts 76 and thereafter flows through a single tube 178 mounted externally of the engine casing, from which it is directed through one of the upstream struts 74 to pressurize the seal chamber 111 associated with the upstream sump chamber 84 as shown in FIG. 2. At the same time, a second portion of the air exiting the chamber 123 is directed to the seal pressurization chamber 118 formed on the upstream side of the sump chamber 86 by means of piping 180 and passageway 182 associated with the conical frame member 117.

As previously mentioned, the lubricating fluid injected into the bearing chambers is removed from the chambers by means of scavenge pumps and discharged to a suitable reservoir (not shown) for repressurization and redelivery to the bearing chambers. For this reason, the downstream sump chamber 88 is provided with the metering and scavenge pump 102 described in the above-mentioned DeLisse et al patent. The pump 102 acts to continuously remove lubricant from the sump chamber 88 as the lubricant is ejected from the orifices 104 and 105 and performs its desired lubricating function. For this reason, the sump chamber 88 is provided with a scavenge pump inlet 184 (FIG. 2b) through which expended lubricant flows to the pump 102 (this inlet would be located in the bottom of the sump chamber 88 and is shown rotated 180° in FIG. 2b to simplify the drawing).

As described in greater detail in the DeLisse et al patent, the pump 102 includes an outlet 186 formed through the drive shaft of speed reduction drive means (not shown) so as to direct scavenged lubricant internally of the gas turbine engine shaft assembly 12 by which the pump 102 is driven. In this manner, lubricant is scavenged from the sump chamber 88 and is delivered to a scavenge chamber 187, formed by the interior of the shaft assembly 12, through which it flows in the direction of the arrows 188. The lubricant is then centrifuged, as shown in FIG. 2, through piping sections 190, 192, 193 and 194 formed in the shaft assemblies 12 and 14, and ring 196 associated with the bearing assembly 66, respectively, to the interior of the sump chamber 86. This lubricant is then scavenged from the sump chamber 86 along with whatever lubricant is delivered thereto during the normal operation of the engine.

The scavenging from the sump chamber 86 can be accomplished in any desired manner, such as by placing an outlet (not shown) at the bottom of the sump chamber 86 through which the lubricant may be delivered, via one of the intermediate struts 76, to a scavenge pump (not shown). Similarly, the lubricant delivered to the upstream chamber 84 is scavenged in any desired manner, such as by placing drain outlets (not shown) at the bottom of the chamber 84 and passing piping connected to the drain outlet through one of the upstream struts 74. The lubricant thus removed from the sump chambers 84 and 86 is thereafter returned to a suitable reservoir for repressurization and redelivery to the bearing chambers.

As previously described, pressurization air is delivered to the chamber 118 formed on the upstream side of the sump chamber 86 by means of piping 180 connected to the chamber 123. In order to provide for the continuous flow of air through the chambers 118 and 123, venting means comprising a passage 197 are formed within the shaft assembly 12 as shown in FIG. 2. In this manner, air flows from the sump chamber 86 to a passageway 200 formed between the shaft assembly 26 and duct 24. The vent air flows aft through the passage 200 and then flows through openings 202 and 204 (FIG. 2b) into the vent tube 172, from which it is dumped overboard. As the shaft assembly 12 rotates, the passageway 197 acts as a centrifuge, which helps to preclude the flow of oil particles into the passageway 200.

As further shown in FIG. 2a, means are also provided for purging an annular chamber 206 formed between the cylindrical shaft 26 and the duct 38 such that no oil can be trapped in the chamber 206. The purge means comprise an opening 208 formed in the duct 38 such that a small portion of the air flowing through the passageway 158 located within the duct 38 flows through the opening 208 to pressurize the chamber 206. In this manner, a pressure differential is established across a pair of seals 210 and 212 located at opposite ends of the chamber 206 as shown in FIGS. 2 and 2b, respectively. Oil is thus precluded from flowing across the seals 210 and 212 and being trapped in the chamber 206.

The use, operation and function of the invention are as follows:

A portion of the air flowing through the core engine compressor 32 is bled through the opening 132 and flows radially inward through the chamber 138. This air is then split into three basic flow paths 142, 144 and 145. The flow path 142 acts as a coolant for the compressor 32 and the turbine discs 146 and 148 prior to being redelivered to the flow stream through orifice 150 and either the seal 154 or the opening 155. A second portion of the compressor bleed flow, as designated by the numeral 144, flows through the annular passage 158 and through the opening 162 to pressurize the chamber 127 located on one side of the sump chamber 88. A portion of the air within the chamber 127 also pressurizes the chamber 129 located on the other side of the sump chamber 88 by passing through the orifice 160.

The third portion of the compressor bleed flow, that designated by the numeral 145, acts first to pressurize the chamber 123 located on one side of the sump chamber 86 and thereafter is utilized to pressurize the chamber 118 located on the upstream side of the sump chamber 86 and also pressurize chamber 111 of the upstream sump chamber via the piping 178. Thus, air being bled from a single location within the compressor is utilized to pressurize each of the sump chambers associated with the engine and is also utilized to cool a significant portion of the rotating components of the engine. After being bled from the compressor, however, the sump pressurization air and the cooling air are maintainined separate from one another (in part by the seal 126) in the system disclosed herein such that the coolant air as it gains heat in performing its cooling function is not thereafter delivered to one of the sump chambers.

A suitable lubricant is delivered to each of the bearing assemblies 64, 66, 68, 70 and 72 via the spray nozzles 92, 95, 96, 97, 98 and 104. Lubricant is precluded from escaping the sump chambers 84, 86 and 88 due to the fact that pressurization air is pressurizing the seal chambers 111, 118, 123, 127 and 129 associated with each of the sump chambers, as described above.

The lubricant delivered to the sump chamber 84 is scavenged therefrom in any suitable manner such as by flowing through a drain outlet located within one of the upstream struts 74 positioned at the bottom of the engine 10. The lubricant delivered to the downstream sump chamber 88 is scavenged therefrom by means of the metering and scavenge pump 102 and is delivered to the chamber 187 formed within the shaft assembly 12. From this chamber the scavenged oil is centrifuged into the intermediate sump chamber 86 through the openings 190, 192, 193 and 194. The lubricant thus delivered to the sump chamber 86, and all of the lubricant delivered through the spray nozzles 95 and 96, is scavenged therefrom in any suitable manner, such as by means of a drain outlet located in the bottom thereof which is connected to piping extending through one of the intermediate struts 76.

A first portion of the seal pressurizing air is vented through the passageway 200 formed between the shaft 26 and the duct 24 as it is delivered thereto from the sump chamber 86 through the passageway 197. That portion of the seal pressurization air which is delivered to the sump chamber 88 is vented therefrom in a similar manner through the openings 166, 168 and 169 which permit this air to flow to the vent tube 172.

As described above, Applicants have provided a gas turbine engine pressurization and scavenge system which eliminates the need for external pressurization and scavenge tubes for a sump chamber located beneath the turbine section of the engine. In this manner, Applicants have simplified the external tubing arrangement which is associated with the engine and have permitted the reduction in size of the downstream struts 82, thereby providing a more efficient engine.

It should be apparent that slight changes could be made in the structural members described above without departing from the broad concepts disclosed herein by the inventors. The appended claims are intended to cover such modifications.

What is claimed is:

1. In a gas turbine engine of the type including at least first and second compressor portions and first and second turbine portions; at least two concentric, hollow shaft assemblies operatively connecting certain of said compressor portions to certain of said turbine portions; a plurality of bearing assemblies adapted to rotatably support said shaft assemblies; casing means enclosing portions of said compressors and said turbines, said casing means adapted to define, at least in part, a generally annular motive flow passage therethrough having an inlet upstream of at least one of said compressor portions and an outlet downstream of at least one of said turbine portions; said casing means further defining, in cooperation with at least one of said shaft assemblies, a first bearing chamber and at least a second axially spaced bearing chamber, said bearing chambers adapted to enclose said bearing assemblies and receive a lubricating fluid; a plurality of seal pressurization chambers, at least one of which is associated with each said bearing chamber; means for delivering air into said seal pressurization chambers; means for venting said bearing chambers to establish a continuous flow of air through said bearing chambers; and means for scavenging said lubricating fluid from said bearing chambers; the improvement comprising:

said air delivery means and said scavenge means for at least a first of said bearing chambers being formed internally of at least one of said shaft assemblies such that the air delivery and scavenge functions may be accomplished for said first bearing chamber without the necessity of piping extending across said annular motive flow passage or piping mounted externally of said engine; and wherein said air delivery means comprise a bleed port located intermediate of one of said compressor portions, a bleed chamber formed internally of said compressor portion, and at least two flow paths extending from said bleed chamber, the first said flow path comprising a seal pressurization flow path and the second said flow path comprising a compressor coolant flow path.

2. The improved gas turbine engine recited in claim 1 further characterized in that said seal pressurization flow path comprises, in part, an annular seal pressurization passageway formed within one of said shaft assemblies and extending from said bleed chamber to one of said bearing chambers, and said scavenge means includes a scavenge passageway formed within one of said shaft assemblies, said scavenge passageway extending from one of said bearing chambers to a second of said bearing chambers.

3. The improved gas turbine engine recited in claim 2 further characterized in that said venting means include an annular vent passage formed internally of one of said shaft assemblies.

4. The improved gas turbine engine recited in claim 3 further characterized in that said seal pressurization flow path and said compressor coolant flow path are maintained separate from one another after the air exits said bleed chamber.

5. The improved gas turbine engine recited in claim 4 further including a third flow path from said bleed chamber, said third flow path comprising a seal pressurization flow path for at least said upstream bearing chamber while said first flow path forms a seal pressurization flow path for a downstream bearing chamber.

6. The improved gas turbine engine recited in claim 5 further characterized in that said engine includes at least three of said bearing chambers, and said third flow path comprises a seal pressurization flow path for at least two of said bearing chambers.

7. A gas turbine engine including, in combination:

a first and second compressor and a first and second turbine arranged in serial flow relation; concentric inner and outer hollow shaft assemblies operatively connecting, respectively, a portion of said first compressor with a portion of said second turbine and a portion of said second compressor with a portion of said first turbine; core engine casing means enclosing at least said second compressor and said turbines, said casing means adapted to define, at least in part, a generally annular motive flow passage therethrough having an inlet upstream of at least said second compressor and an outlet downstream of said second turbine; bearing means carried by said casing means at at least three axially spaced locations for rotatably supporting said shafts; said casing means further defining, in cooperation with at least one of said shaft assemblies, a bearing chamber at each of said three locations adapted to enclose said bearing means and receive a lubricating fluid, means for supplying lubricating fluid to said bearing chambers, the upstream one of said bearing chambers disposed adjacent the upstream end of said inner shaft assembly, another of said bearing chambers disposed adjacent the upstream end of said outer shaft assembly and another bearing chamber disposed downstream of said intermediate bearing chamber; a plurality of seal pressurization chambers, at least one of which is associated with each said bearing chamber; a central scavenge passage formed internally of said inner shaft assembly and adapted to fluidically connect said downstream bearing chamber to said intermediate bearing chamber, means for delivering lubricating fluid from said downstream bearing chamber to said intermediate bearing chamber, and means for scavenging lubricating fluid from said intermediate bearing chamber; means for pressurizing each of said seal pressurization chambers, said pressurizing means including a bleed port located intermediate of said second compressor, a bleed chamber lying in fluid flow communication with said port, an annular passageway formed, in part, by said outer shaft assembly, which passageway lies in fluid flow communication with said bleed chamber and is adapted to deliver pressurizing air from said bleed port to at least one said seal pressurization chamber associated with said downstream bearing chamber such that said downstream bearing chamber may be both pressurized and scavenged without the need for piping mounted externally of said casing means or piping extending across said annular motive flow passage downstream of said second turbine; and a coolant flow path extending from said bleed chamber to provide pressurized air for cooling a portion of said second compressor, said coolant flow path maintained separate from the seal pressurization flow path after the air exits said bleed chamber.

8. The gas turbine engine recited in claim 7 further including means for venting each of said bearing chambers such that a continuous flow of cool pressurizing air is circulated therethrough, said venting means for said intermediate chamber comprising an annular vent flow path formed by one of said inner and outer shaft assemblies, passage means for connecting said intermediate bearing chamber with said vent flow path, and means for venting said vent flow path overboard.

9. The gas turbine engine recited in claim 8 further characterized in that the air exiting said bleed chamber forms at least three separate flow paths, the first being said compressor coolant flow path, the second being a seal pressurization flow path for said downstream bearing chamber, and the third being a seal pressurization flow path for said intermediate bearing chamber and said upstream bearing chamber.

10. The gas turbine engine recited in claim 9 further including means for venting said seal pressurization chamber associated with said downstream bearing chamber, said downstream venting means lying in serial flow communication with said annular vent flow path.

* * * * *